Sept. 7, 1954          A. C. RUGE          2,688,727
MEASURING CIRCUIT FOR CONDITION RESPONSIVE IMPEDANCE
Original Filed April 10, 1945          2 Sheets-Sheet 1
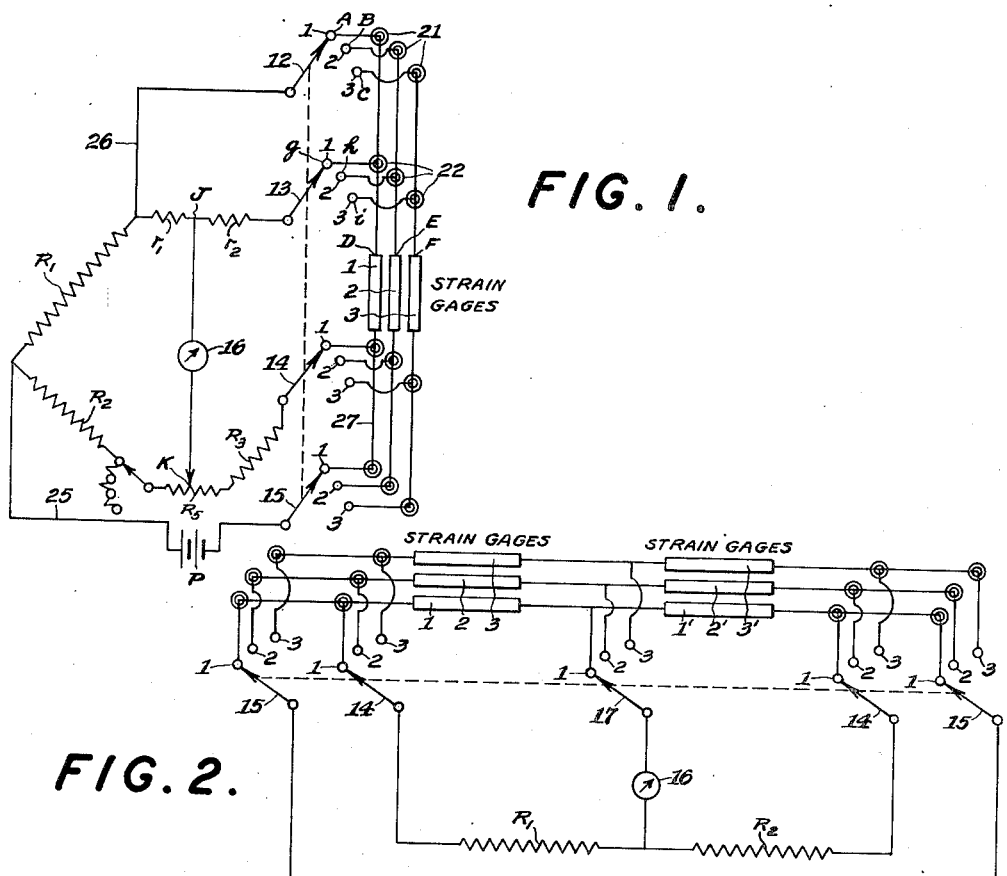
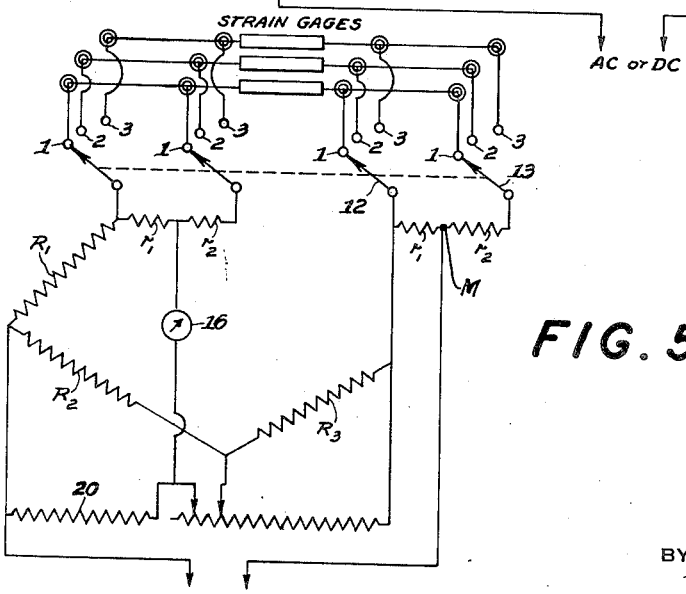
INVENTOR
ARTHUR C. RUGE
BY
ATTORNEY Sept. 7, 1954  A. C. RUGE  2,688,727
MEASURING CIRCUIT FOR CONDITION RESPONSIVE IMPEDANCE
Original Filed April 10, 1945  2 Sheets-Sheet 2

INVENTOR
ARTHUR C. RUGE
BY
ATTORNEY

Patented Sept. 7, 1954

2,688,727

UNITED STATES PATENT OFFICE 2,688,727

MEASURING CIRCUIT FOR CONDITION RESPONSIVE IMPEDANCE

Arthur C. Ruge, Cambridge, Mass., assignor to Baldwin-Lima-Hamilton Corporation, a corporation of Pennsylvania Original application April 10, 1945, Serial No. 587,635. Divided and this application June 2, 1951, Serial No. 229,603

15 Claims. (Cl. 324—57)

The present invention relates generally to measuring apparatus, and more particularly for measuring conditions such, for example, among others, as torque, temperature, pressure, speed, accelerations, tension, compression, or strains arising from various causes, when the condition to be measured causes a change in the electrical impedance of a responsive element attached to a member or part undergoing test. This application is a division of my copending application Serial No. 587,635 filed April 10, 1945, now Patent 2,561,317.

Apparatus of the type specifically disclosed herein employs, for purposes of illustration, a plurality of strain sensitive electrical impedance means adapted to be responsive to a condition to be measured, preferably but not necessarily by being mounted upon a member undergoing a test, so as to produce impedance changes responsive to potentially variable strains or conditions, the voltage changes being selectively transmitted to an indicating, measuring, or controlling device. One difficulty with this general type of apparatus resides in the variation of resistance in contacts which are necessary to use, such resistance not only being erratic as compared to the relatively small change of impedance to be measured, but is more often than otherwise higher than the change desired to be measured. Thus, a serious problem is presented in determining the amount of the impedance change, particularly if a high degree of accuracy is desired and especially when the strain sensitive means of a relatively low impedance type.

In my said copending application I claim an arrangement for overcoming the above difficulties by utilizing relatively high voltage and a large ballast resistor in combination with selective circuit connecting means.

It is an object of my present invention to provide an improved apparatus for succesively connecting separate condition-responsive electrical impedance means into a measuring circuit substantially uninfluenced by contact resistances, the apparatus being adapted to utilize lower operating voltage than above mentioned while at the same time not sacrificing the high degree of accuracy, sensitivity and dependability desired in apparatus of this type.

A further object is to provide an improved apparatus that is possible of low voltage operation and includes a measuring circuit in combination and selectively operative with a plurality of strain gages of the type providing small values of impedance change for a given change in strain thereby obtaining a high degree of safety and convenience to the operator.

Other objects and advantages will be more apparent to those skilled in the art from the following description of the accompanying drawings in which:

Fig. 1 is a diagram of one form of the present invention;

Fig. 2 is a diagram of a modification of the invention wherein a multiplicity of variable impedance devices is arranged in pairs;

Fig. 5 is a diagram of a further modification showing an alternate means for adjusting the balance of the bridge.

Figure 3:
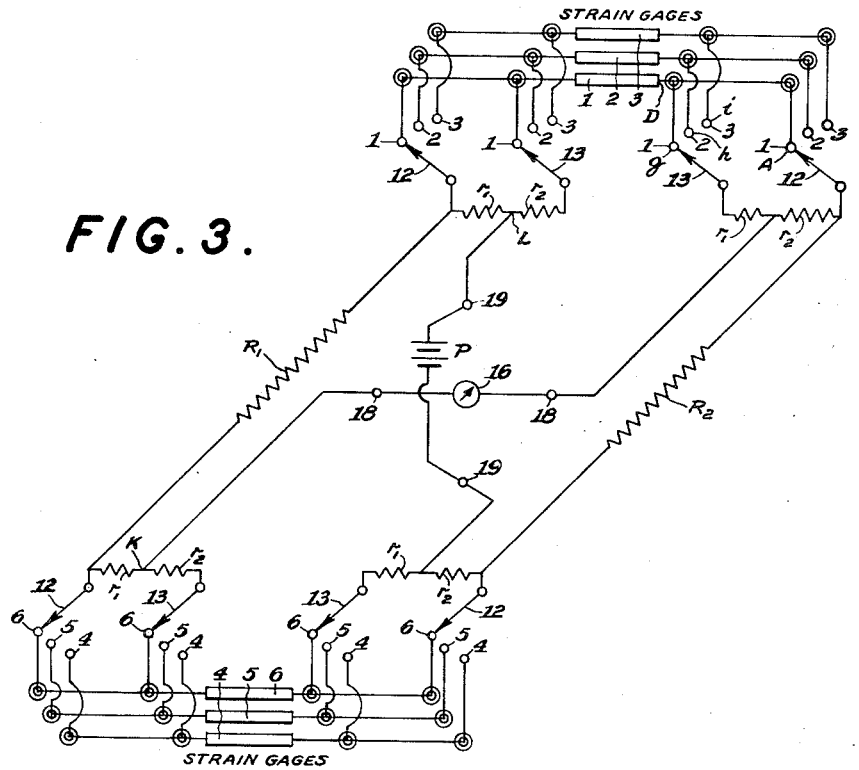
Fig. 3 is a diagram showing a further modification of the switching circuit of the invention.

Referring to the drawings, Fig. 1 shows a wiring diagram of an improved switching circuit for switching a multiplicity of condition responsive means 1, 2, 3 into a measuring circuit. In this arrangement I employ a special bridge circuit in which the elements 1, 2, 3 form one arm, the circuit between the elements and the remainder of the bridge beting completed by switches 12, 13, 14, 15. Resistances $R_1$, $R_2$, $R_3$ and $R_5$ form three arms of the bridge circuit, and means for adjusting the balance of the bridge is indicated schematically for convenience. The resistance $R_3$ is chosen to be very large relative to the contact resistance of switch 14, its value being say 10,000 or 100,000 ohms. The resistance $R_3$ is referred to herein in the foregoing circuit as a "ballast resistance" but, more broadly, "ballast impedance." The word ballast is here used in the sense of a load employed for the purpose of steadying the current through the circuit. The absolute magnitude of such a ballast impedance is not the criterion, but rather the magnitude of the ballast relative to contact resistances in the circuit which tend to render the current unsteady due to uncontrollable or erratic variations which the contact resistances may undergo. Resistances $R_1$ and $R_2$ are chosen so as to balance the bridge in any convenient manner. Where temperature compensation is desired $R_1$ may be a dummy element corresponding to the active elements 1, 2, 3. A voltage divider $r_1$, $r_2$, is so chosen that the variable contact resistance of switches 12 and 13 does not produce appreciable effect upon the balance point of the bridge. A source of power is fed to the common connection of $R_1$ and $R_2$ and, by means of switch 15, is selectively fed to elements 1, 2, 3. Switch 12 selectively carries the current flowing through elements 1, 2, 3, to resistance $R_1$, thus completing the power circuit. Auxiliary switch 13 selectively connects elements 1, 2, 3, to one end of the voltage divider $r_1$, $r_2$. A second auxiliary switch 14 connects elements 1, 2, 3 to resistance $R_3$.

In the operation of this Fig. 1 the resistance across auxiliary switch 13 will change the balance of the bridge only very slightly in relation to the resistance $r_2$ which, together with $r_1$, is shunting the already small contact resistance across switch 12. Also, the contact resistance across auxiliary switch 14 changes the balance of the bridge only in relation to resistance $R_3$, which is chosen very much greater than the contact resistance across switch 14. The resistance across power switch 15 does not change the bridge balance at all but merely affects the sensitivity slightly. Now if this bridge is in balance, then the magnitude of the contact resistance across current switch 12 has no influence on the bridge balance. Since resistance $R_1$, is relatively low, a comparatively small voltage is required to produce the necessary current flow through elements 1, 2, 3. I have found in practice that I can use fixed values for $r_1$ and $r_2$ when switching a number of elements of similar resistance values into the circuit and still obtain very accurate results. This makes for simplicity in design and operation of the circuit.

Although I have shown elements 1, 2, 3 being switched in at both terminals, in many instances one or the other sets of terminals of the elements will be commoned, thus eliminating either switches 14 or 15, or switches 12 and 13. As will be evident to those versed in the art, Fig. 1 is illustrative only and many variations may be employed without affecting the scope of my invention. For example, the bridge arms may vary greatly in resistance from those shown and they may be made up of suitable impedances such as resistive, inductive, or capacitative, as desired. For purposes of clarity I have illustrated my invention with simple resistive elements.

In some applications, such as shown in Fig. 2, it is desirable to switch a multiplicity of elements in pairs such as 1 and 1', 2 and 2', 3 and 3', into the measuring circuit. For this purpose I employ current switches 15 to carry the current from the power source to the elements and I employ auxiliary switches 14 to connect the elements into a bridge circuit completed by resistances $R_1$ and $R_2$. Another auixiliary switch 17 serves to connect detector 16 between the commons of the pairs of elements and the common of $R_1$ and $R_2$ which are made large relative to the contact resistance of the auxiliary switches 14 and hence are negligibly affected by variations in the contact resistance. The contact resistance across switches 15 has no effect upon the bridge balance and only slightly affects the sensitivity. The contact resistance of auxiliary switch 17 obviously does not affect the bridge balance. As with any Wheatstone bridge, the battery and galvanometer may be interchanged if desired without impairing the functioning of the circuit. In most instances it will be permissible to common either one end of the elements 1, 2, 3 thus eliminating one set of switches 14 and 15, or to common the junctions of the pairs of elements, thus eliminating switch 17.

This circuit has the advantage that arms 1 and 1', etc., may be differentially variable and yet compensate each other for temperature effects. Thus, 1 and 1', can be strain gages on opposite sides of a member subject to bending or they may be so disposed on a torsion or direct stress member as to vary differentially with the applied strain. The elements may also be devices differentially responsive to temperature or other functions, or they may for example be the two arms of a conventional two-arm electromagnetic strain gage, etc., without affecting the scope of my invention.

Figure 4:
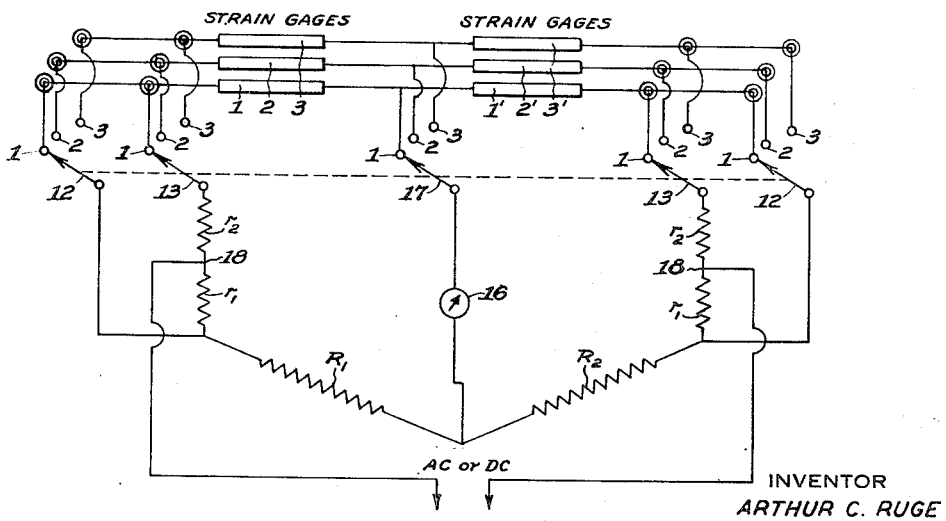
Fig. 4 is a diagram of a switching circuit of the invention more particularly for association with the measurement of differential temperature and strains.

In the modified forms of the invention shown in Figs. 3, 4 and 5, the switching circuits are improvements over the circuit of Fig. 1 in that they obviate the necessity of employing the high resistance arm $R_3$ and in that any or all arms of the bridge may be brought out through main and auxiliary switches. Corresponding parts of the various figures are given the same reference numbers even though several of these parts are found in Figs. 3, 4 and 5 in somewhat different arrangement from that of Fig. 1.

Fig. 3 shows how one or more arms of the bridge can be brought out through main and auxiliary switches without introducing appreciable errors due to switch contact resistance. It should be observed that arms $R_1$ and $R_2$ could be likewise carried out through switches so long as the main and auxiliary switches are used in the manner shown for bringing out the elements 1, 2, 3. The opposite "corners of the bridge" are marked 18 and 19. The power P may be applied across either pair of like-numbered corners. Means for balancing the bridge are indicated as 16. Power source P can just as well be connected across corners 18, 18 while balance means 16 is connected across corners 19, 19 without affecting the benefits derived from this invention.

The essential feature of Figs. 3 and 4 is the use of the voltage divider and auxiliary switch circuit at each corner where an element is switched into the bridge. This permits the use of low impedance arms throughout if desired and is of value because the low impedance arms minimize the possibility of picked-up disturbances when used with electronic devices. It also makes it practical to use low-resistance galvanometers as bridge balance indicators.

Fig. 4 is a modified circuit which is useful when temperature compensation is essential or where differential temperature or strain measurements are to be made. This circuit gives as good results employing low resistance arms $R_1$, $R_2$ as does the circuit of Fig. 2 using its high resistance arms $R_1$, $R_2$.

Fig. 5 embodies another modification of the circuit wherein a balancing device 20 is employed in connection with a circuit into which a multiplicity of elements or gages 1, 2, 3 is selectively switched. It should be recognized that any or all arms of the bridge may be brought out through switches after the teaching of Fig. 3 so long as the balancing circuit connects to the dividing point of the appropriate divider. Thus, in Fig. 3 or 4, the balancing circuit 20 can go across the corners 18 or 19, at each corner connecting power and balancing circuit 20 in the manner shown at bridge corner M of Fig. 5. This combination substantially eliminates errors both from contact resistance and power source variation.

I have shown throughout switching at both ends of the elements concerned for the sake of completeness. In many applications one or the other end of the elements would be commoned, thus eliminating one set of switches.

In the circuit of Fig. 1 which is taken as illustrative, each gage 1, 2 and 3 or element to be measured is independently tied to two terminals or binding posts 21 and 22, of which the posts 21 are included in the respective circuits determined by the contacts under control of the switch 12. The terminals or posts 22, however, are respectively included in the circuits determined by the contacts under control of the switch 13. Thus, the posts 22 carry a potential to the measuring circuit while the posts 21 primarily carry current to the selected element to be measured. By this novel double post arrangement the terminals of the elements to be switched in are connected by simple mechanical pressure-connecting means without introducing errors due to contact resistance at these points. By "independently tied" I mean that the connection at post 21 is in no way dependent upon the existence of a connection at post 22, and vice versa. For sake of simplicity the binding posts are shown in the various modifications in the form of double concentric circles. In every case the arrangement is the same; namely, a terminal of the element to be brought in by switching is independently connected to two mechanical pressure-connecting means, one of which is included in the circuits determined by the contacts under control of one of the switches provided for that terminal, while the other is included in the circuits determined by the contacts under control of the other switch provided for that terminal.

In summary, it might be pointed out that in Fig. 1 there exists a first or power circuit including a source of power P for supplying current to the electrical impedance strain gage devices 1, 2 and 3 each of which has two terminals, this power circuit including a wire 25, a bridge arm $R_1$, a wire 26, contacts such for example as A, B and C for selectively connecting one terminal D, E, or F of strain gage elements 1, 2 or 3 into the power circuit and thence through a wire such as 27 and switch arm 15 to the other side of the power source P. A second circuit responsive to the change of electrical impedance of any one of the electrical impedance strain gage devices includes contacts such as $g$, $h$ and $i$ for selectively connecting the connected strain gage impedance devices through the same terminals D, E, F into the second circuit in the same sequence as the power circuit selecting means. The second circuit comprises a Wheatstone bridge of which the selected strain gage impedance device is one arm and the other impedance elements such as $R_1$, $R_2$, and $R_3$ constitute the remaining three arms. The bridge has, at one corner, a voltage divider $r_1$ and $r_2$ inserted between two adjacent arms such as $R_1$ and selected strain gage impedance 1. The divider is adjacent to and in series with the second circuit contacts $g$, $h$ or $i$ through switch arm 13 and has an electrical impedance whose value is substantially greater than that of the contact resistance of the second circuit contacts, $g$, $h$ and $i$. Detecting means 16 is also included in the second circuit for detecting changes of impedance of the electrical impedance devices 1, 2, or 3 and is connected to the voltage dividing point J of the divider and to the opposite corner K of the bridge. The voltage divider serves to divide the voltage drop arising from contact resistance of the power circuit contact such as A so that the detecting means is thereby substantially unaffected by contact resistance and by changes in contact resistance of the power circuit contacts A, B, C and the second circuit contacts $g$, $h$, $i$. A resistance $R_5$ having adjustable contact at K with detecting means 16 is indicated in Fig. 1 as a convenient means of adjusting the balance of the bridge circuit.

In Fig. 3 the first or power circuit consists of power source P which connects at the dividing point L of a voltage divider and then proceeds by parallel paths through switch arms 12 and 13 to one terminal of a selected strain gage impedance device such as 1, thence through contact A, arm $R_2$, resistance $r_2$ and connection 19 to power source P. The second or measuring circuit comprises a Wheatstone bridge the arms of which are $R_1$, $R_2$ and the selected strain gage devices such as 1 and 6. The corners of this bridge circuit have voltage dividers $r_1$, $r_2$ which are adjacent to and selectively connected to the devices 1 and 6. It will be seen that, by making the impedance of each voltage divider substantially greater than the contact resistances leading to it, the result is to make the bridge circuit substantially unresponsive to any combination of contact resistance or change of contact resistance of the selective contacts in either the power circuit or the second circuit. As stated above, the power source and detector can be interchanged in any of the figures without impairing the freedom from contact errors.

It will, of course, be understood that various changes in details of construction and arrangement of parts may be made by those skilled in the art without departing from the spirit of the invention as set forth in the appended claims.

I claim:

1. Apparatus responsive to a change of condition to be measured comprising, in combination, a plurality of electrical impedance devices adapted to undergo a change of impedance, each of which has two terminals, said devices being adapted to undergo a change of impedance in response to a change of condition, a first circuit selectively passing through said electrical impedance devices through both of said terminals and including contacts for selectively connecting one terminal of any of said devices into this circuit, a second circuit including contacts for selectively connecting said connected impedance device through said one terminal into this second circuit in the same sequence as said first circuit selecting means, the contacts of the first circuit being outside of the second circuit and also the contacts of the second circuit being outside of the first circuit, said second circuit comprising a Wheatstone bridge of which the selected device is one arm and other impedance elements constitute the remaining three arms, said bridge having at one corner a voltage divider inserted between two adjacent arms, said divider being adjacent to and in series with said second circuit contacts and having an electrical impedance whose value is substantially greater than that of the contact resistance of said second circuit contacts, a source of power included in one of said circuits, means included in the other of said circuits for detecting changes of impedance of said electrical impedance devices, whereby the detecting means is substantially unaffected by contact resistance and by changes in contact resistance of the selective contacts of said first and second circuits.

2. The combination set forth in claim 1 further characterized in that the Wheatstone bridge circuit includes means for adjusting the balance of said bridge.

3. The combination set forth in claim 1 further characterized in that a multiplicity of impedance devices is arranged in pairs with means for switching said devices in pairs into said first and second circuits, each of said pairs having a common junction point which forms one corner of the Wheatstone bridge of said second circuit when said pair is selectively connected into said first and second circuits, and additional selective contacts are provided for connecting the remaining terminal of any of said pairs into said first and second circuits and including an additional voltage divider at the bridge corner adjacent to said remaining terminal, said divider being adjacent to and in series with the second circuit contacts corresponding to said remaining terminal.

4. The combination set forth in claim 1 further characterized in that a multiplicity of impedance devices is arranged in pairs with means for switching said devices in pairs into said power and second circuits, each of said pairs having a common junction point and selective connecting means for connecting said junction points to said detecting means in the same sequence as said power circuit selecting means.

5. The combination set forth in claim 1 further characterized in that a multiplicity of impedance devices is arranged in pairs with means for switching said devices in pairs into said power and second circuits, each of said pairs having a common junction point which forms one corner of the Wheatstone bridge of said second circuit when said pair is selectively connected into said first and second circuits, two adjacent arms of said bridge comprising the selected pair of impedance devices and the remaining two arms comprising other impedance elements, and means for adjusting the balance of said bridge.

6. Apparatus responsive to a change of condition to be measured comprising, in combination, a plurality of electrical impedance devices each of which has two terminals, said devices being adapted to undergo a change of impedance in response to a change of the condition, a power circuit including a source of power for supplying current to said electrical impedance devices through both of said terminals and including contacts for selectively connecting one terminal of any of said devices into said power circuit, a second circuit responsive to changes of the electrical impedance of any one of the connected impedance devices including contacts for selectively connecting said connected impedance device through said one terminal into said second circuit in the same sequence as said power circuit selecting means, said second circuit comprising a Wheatstone bridge of which the selected device is one arm and other impedance elements constitute the remaining three arms, said bridge having at one corner a voltage divider inserted between two adjacent arms, said divider being adjacent to and in series with said second circuit contacts and having an electrical impedance whose value is substantially greater than that of the contact resistance of said second circuit contacts, means also included in said second circuit for detecting changes of impedance of said electrical impedance devices, said detecting means being connected to the voltage dividing point of said divider and to the corner of the bridge opposite thereto, said voltage divider serving to divide the voltage drop arising from contact resistance of the power circuit contact so that the detecting means is thereby substantially unaffected by contact resistance and by changes in contact resistance of said power circuit and said second circuit selective contacts.

7. The combination set forth in claim 6 further characterized in that the Wheatstone bridge circuit includes means for adjusting the balance of said bridge.

8. The combination set forth in claim 6 further characterized in that a second voltage divider having two ends and a voltage dividing point is connected between the remaining arm adjacent to said connected device and the other terminal of said impedance device, said power source being connected to the dividing point of the second voltage divider, and at least two selective connecting means independently connecting the ends of said second voltage divider to said other terminal of said connected impedance device in the same sequence as said power circuit selecting means.

9. The combination set forth in claim 6 further characterized in that a second voltage divider having two ends and a voltage dividing point is connected between the remaining arm adjacent to said connected device and the other terminal of said impedance device, said power source being connected to the dividing point of the second voltage divider, at least two selective connecting means independently connecting the ends of said second voltage divider to said other terminal of said connected impedance device in the same sequence as said power circuit selecting means, and said other terminal of said connected device being connected to the ends of said second voltage divider through at least two mechanical pressure connection means, both of which are independently connected by mechanical pressure connection to said other terminal, said mechanical pressure connections being in series with said selective connecting means.

10. The combination set forth in claim 1 further characterized in that each of said impedance devices is electrically connected to its corresponding first and second circuit selective contacts through at least two mechanical pressure connection means, both of which are independently electrically connected by mechanical pressure connection to said one terminal of one of said electrical impedance devices which is to be switched into the circuit, one of said pressure connecting means being electrically connected to the corresponding first circuit selective contact, the other said pressure connecting means being electrically connected to the corresponding second circuit selective contact, so that the contact resistances of said mechanical pressure connections are respectively in series with the selective contact resistances of said first and second circuits, whereby the response of said detecting means is substantially independent of any combination of contact resistances and changes in contact resistances of the selective contacts and the pressure connecting means in both first and second circuits.

11. Apparatus responsive to a change of condition to be measured comprising, in combination, a plurality of electrical impedance devices adapted to undergo a change of impedance in response to a change of the condition, a power circuit including a source of power for supplying current to said electrical impedance devices including contacts for selectively connecting said devices into said power circuit, a second circuit connected directly in parallel with said source of power through said power circuit selective contacts, said second circuit being responsive to changes of the electrical impedance of any one of the connected impedance devices and including contacts for selectively connecting said devices into said second circuit in the same sequence as said power circuit selecting means, means also included in said second circuit for detecting said changes of impedance, and said second circuit also including a ballast impedance which is directly connected to one of said impedance devices upon operation of the corresponding selective contact for connecting it into said second circuit, said ballast impedance being very large relative to the contact resistance of any of said second circuit contacts, whereby the response of said detecting means is substantially independent of the resistance of said selective contacts in said power circuit and said second circuit.

12. The combination set forth in claim 11 further characterized in that said second circuit is in the form of a Wheatstone bridge, said impedance devices selectively forming one arm of said bridge, said ballast impedance forming an arm adjacent thereto, and other impedance devices forming the remaining two arms of the bridge, and means included for adjustment of the balance of said bridge.

13. The combination set forth in claim 11 further characterized in that a multiplicity of impedance devices is arranged in pairs with means for switching said devices in pairs into said power and second circuits, each of said pairs having a common junction point and selective connecting means for connecting said junction points to said detecting means in the same sequence as said power circuit selecting means.

14. The combination set forth in claim 11 further characterized in that a multiplicity of impedance devices is arranged in pairs with means for switching said devices in pairs into said power and second circuits, each of said pairs having a common junction point and selective connecting means for connecting said junction points to said detecting means in the same sequence as said power circuit selecting means, said second circuit being in the form of a Wheatstone bridge, two adjacent arms of which comprise the selective pair of impedance devices and the remaining two arms comprise ballast resistors, and means for adjusting the balance of said bridge.

15. The combination set forth in claim 11 further characterized in that said power circuit includes at least two mechanical pressure-connecting means which are independently electrically connected by mechanical pressure connection to a terminal of one of said electrical impedance devices, which terminal is to be selectively connected to said power and second circuits, one of said connecting means being electrically connected to the power circuit selective contact corresponding to said terminal and the other being connected to the second circuit selective contact corresponding to said terminal, so that the contact resistances of said mechanical pressure connections are respectively in series with the selective contact resistances of said power and second circuits.

References Cited in the file of this patent

UNITED STATES PATENTS

| Number | Name | Date |
| --- | --- | --- |
| 1,689,313 | Wood | Oct. 30, 1928 |
| 2,252,464 | Kearns | Aug. 12, 1941 |
| 2,392,293 | Ruge | Jan. 1, 1946 |
| 2,423,620 | Ruge | July 8, 1947 |
| 2,434,438 | Ruge | Jan. 13, 1948 |
| 2,561,317 | Ruge | July 17, 1951 |